US008538743B2

(12) United States Patent
Gago et al.

(10) Patent No.: US 8,538,743 B2
(45) Date of Patent: Sep. 17, 2013

(54) DISAMBIGUATING TEXT THAT IS TO BE CONVERTED TO SPEECH USING CONFIGURABLE LEXEME BASED RULES

(75) Inventors: Oswaldo Gago, Margate, FL (US); Steven M. Hancock, Delray Beach, FL (US); Maria E. Smith, Davie, FL (US)

(73) Assignee: Nuance Communications, Inc., Burlington, MA (US)

( * ) Notice: Subject to any disclaimer, the term of this patent is extended or adjusted under 35 U.S.C. 154(b) by 1119 days.

(21) Appl. No.: 11/689,271

(22) Filed: Mar. 21, 2007

(65) Prior Publication Data

US 2008/0235004 A1 Sep. 25, 2008

(51) Int. Cl.
*G06F 17/27* (2006.01)

(52) U.S. Cl.
USPC ...... 704/9; 704/1; 704/10; 704/258; 704/260; 715/261

(58) Field of Classification Search
USPC .................................... 704/1, 9, 10, 258, 260
See application file for complete search history.

(56) References Cited

U.S. PATENT DOCUMENTS 5,157,759 A 10/1992 Bachenko
5,634,084 A * 5/1997 Malsheen et al. ............. 704/260
5,930,756 A 7/1999 Mackie et al.
6,098,042 A * 8/2000 Huynh .......................... 704/260
6,182,028 B1 1/2001 Karaali et al.
7,236,923 B1 * 6/2007 Gupta .............................. 704/9
7,539,619 B1 * 5/2009 Seligman et al. ............. 704/277
7,684,988 B2 * 3/2010 Barquilla ................... 704/256.1
2001/0049602 A1 12/2001 Walker et al.
2002/0026456 A1 * 2/2002 Bradford ........................ 707/500
2002/0042707 A1 4/2002 Zhao et al.
2002/0087508 A1 * 7/2002 Hull et al. ......................... 707/1
2003/0018670 A1 * 1/2003 Ashford et al. ............... 707/532
2003/0074183 A1 * 4/2003 Eisele ............................... 704/1
2003/0216919 A1 11/2003 Roushar
2004/0093331 A1 * 5/2004 Garner et al. ..................... 707/3
2005/0192807 A1 9/2005 Emam et al.
2005/0234724 A1 10/2005 Aaron et al.
2005/0267757 A1 * 12/2005 Iso-Sipila et al. ............. 704/260
2006/0117052 A1 * 6/2006 Bradford ....................... 707/101
2006/0129380 A1 6/2006 El-Shishiny (Continued)

OTHER PUBLICATIONS

Gros et al. (Gros, SI-PRON Pronunciation Lexicon; a New Language Resource for Slovenian), 2006, Informatica, vol. 30, pp. 447-452.*

(Continued)

*Primary Examiner* — Lamont Spooner
(74) *Attorney, Agent, or Firm* — Wolf, Greenfield & Sacks, P.C.

(57) ABSTRACT

A software language including language constructs for disambiguating text that is to be converted to speech using configurable lexeme based rules. The language can include at least one conditional statement and a significance indicator. The conditional statement can define a sense of usage for a lexeme. The significance indicator can define a criteria for selecting an associated sense of usage. The language can also include an action expression that is associated with a conditional statement that defines a set of programmatic actions to be executed upon a selection of the associated usage sense. The conditional statement can include a context range specification that defines a scope of an input string for examination when evaluating the conditional statement. Further, the conditional statement can include a directive that represents a defined condition of the lexeme or the text surrounding the lexeme.

17 Claims, 3 Drawing Sheets

(56) References Cited

U.S. PATENT DOCUMENTS

| | | | | |
|---|---|---|---|---|
| 2006/0229873 | A1 | 10/2006 | Eide et al. | |
| 2007/0067157 | A1 * | 3/2007 | Kaku et al. | 704/10 |
| 2007/0130276 | A1 * | 6/2007 | Zhang et al. | 709/207 |
| 2007/0233656 | A1 * | 10/2007 | Bunescu et al. | 707/3 |
| 2007/0271340 | A1 * | 11/2007 | Goodman et al. | 709/206 |

OTHER PUBLICATIONS

Mikheev, Document Centered Approach to Text Normalization, 2000, Proceedings of the 23$^{rd}$ annual internation ACM SIGIR, ACM, pp. 136-143.*

Brown et al., Capitalization Recovery for Text, 2002, Information Retrieval Techniques for Speech Applications, vol. 2273, pp. 11-22.*

Park et al., Hybrid text mining for finding abbreviations and their definitions, 2002, Citeseer, pp. 1-8.*

Sproat, R., et al., "A Corpus-based Synthesizer," Proc. of the Int'l. Conf. on Spoken Language Processing (ICSLP),vol. 12, Sec. 4, Oct. 1992, pp. 563-566.

Yarowsky, D., "Hierarchical Decision Lists for Word Sense Disambiguation," Computers and the Humanities, vol. 34, No. 1-2, Secs. 2.1-2.3, Table 1, pp. 179-186, Apr. 1, 2000.

Tzoukermann, E., "Text Analysis for the Bell Labs French Text-To-Speech System," 5th Int'l. Conf. on Spoken Language Processing, paper 0075, Oct. 1, 1998.

* cited by examiner

200

Conditional Evaluation Elements 205

| Directive 210 | Satisfaction Requirements 215 |
| --- | --- |
| POS | Any word in the specified context has the specified part of speech. |
| word | The specified word appears anywhere in the specified context, regardless of letter case. |
| word_set | Any word in the specified context is a member of the specified word set, regardless of letter case. |
| upper_case | Any or all words in the specified context range appear entirely in upper case. |
| lower_case | Any or all words in the specified context range appear entirely in lower case. |
| mixed_case | Any or all words in the specified context range appear with irregular casing. |
| capitalized | Any or all words in the specified context range appear with the first letter uppercase and any subsequent letters lower case. |
| digit_string | Any or all characters in the specified context range are numeric digits. |
| punct | One or more of the specified punctuation appears anywhere within the boundaries of the specified context range. |

Context Range Specification 220

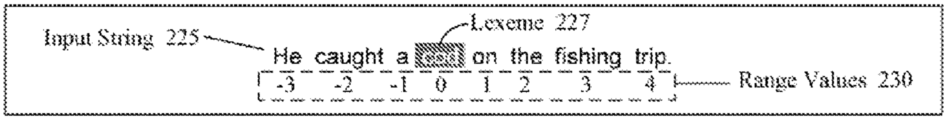

Significance Indicators 235

| Indicator 240 | Definition 245 |
| --- | --- |
| necessary | Conditional statement ***must*** be satisfied to select sense. |
| sufficient | Conditional statement, if satisfied, will result in the sense being selected. |
| 1, 2, 3, . . . (integer value) | Conditional statement, if satisfied, results in this value being added to the score for the associated sense. |

Action Expressions 250

| Expression 255 | Action 260 | Parameters 265 |
| --- | --- | --- |
| substitute | Input text is substituted. | Text to substitute. |
| spell_out | Target lexeme is spelled out as individual letters. | |
| insert_phones | Target lexeme is assigned the specified phones at the corresponding location in the phone stream, and syllables with the specified stress level in the syllable stream. | SPR specifying the syllables, syllable stress levels, and phones for each syllable (e.g., 1kan0trAkt). |
| delete_trailing_period | The period, if any, following the target lexeme is deleted from the input stream. | |

FIG. 2

DISAMBIGUATING TEXT THAT IS TO BE CONVERTED TO SPEECH USING CONFIGURABLE LEXEME BASED RULES

BACKGROUND

1. Field of the Invention

The present invention relates to the field of text-to-speech processing and, more particularly, to disambiguating text that is to be converted to speech using configurable lexeme based rules.

2. Description of the Related Art

One significant challenge in automatically converting text-to-speech (TTS) is handling ambiguous text constructs. Ambiguity can come in many forms, such as abbreviations, acronyms, and homographs. Numerous techniques exist for handling such ambiguous text constructs, though each technique contains a variety of drawbacks.

One conventional technique is to determine the part of speech of the text construct and to disambiguate it based upon this determination. While this is useful for ambiguous constructs that can be distinguished based on their part of speech, this technique cannot effectively handle constructs that do not have a common part of speech. Further, many text segments that are to be speech synthesized are not written in a grammatically precise manner, preventing an accurate determination of the part of speech. For example, text messages, conversational dialogues, and the like are often short, broken text segments, which do not perfectly conform to strict grammar rules.

Another disambiguation technique is to determine a dialog context or topic type and to use the dialog context to prefer various possible interpretations over others. The different possible text constructs are selectively mapped to different dialog contexts to resolve ambiguities. For example, the text construct "MS" can be disambiguated as an acronym for multiple sclerosis in a dialog context of medicine and can be disambiguated as an abbreviation for Mississippi in a dialog context of geography. However, it can be extremely difficult to foresee all the potential dialog contexts in which ambiguous text constructs can be used and to create suitable mappings.

Most conventional disambiguation techniques, such as the ones described above and hybrid solutions including aspects of the above techniques, are implemented using programmatic logic that is embedded within software code. This logic can be difficult, if not impossible, for a user to modify based upon usage considerations. Because of this, conventional disambiguation techniques have difficult coping with an addition of new terms to a vernacular (e.g., IPOD) and may not be situationally configurable.

From an implementation standpoint, conventional disambiguation techniques often handle different types of ambiguous text contracts in different ways and in different processing stages. For example, acronyms and abbreviations can be expanded during a pre-processing stage, which executes before homograph disambiguation occurs. A multi-stage processing technique can be time consuming, which is problematic for real-time speech processing, and can consume significant computing resources, which can be problematic for resource-constrained devices (e.g., smart phones, navigation systems, etc.). Further, a conventional staged disambiguation approach can inhibit competition among different types of ambiguities. For example, an acronym pre-processing stage can expand the text construct COD to mean cash on delivery without weighing the merits of interpreting COD as the word cod, a type of fish.

SUMMARY OF THE INVENTION

The present invention can be implemented in accordance with numerous aspects consistent with material presented herein. For example, one aspect of the present invention can be a software language including language constructs for disambiguating text that is to be converted to speech using configurable lexeme based rules. The language can include at least one conditional statement and a significance indicator. The conditional statement can define a sense of usage for a lexeme. The significance indicator can define a criteria for selecting an associated sense of usage. The language can also include an action expression that is associated with a conditional statement that defines a set of programmatic actions to be executed upon a selection of the associated usage sense. The conditional statement can include a context range specification that defines a scope of an input string for examination when evaluating the conditional statement. Further, the conditional statement can include a directive that represents a defined condition of the lexeme or the text surrounding the lexeme.

Another aspect of the present invention can include a method for disambiguating lexemes in text to speech processing. The method can include loading a set of disambiguation rules that include one or more entries that define usage senses for lexemes. An ambiguous lexeme can be identified in a text input string. An entry in the disambiguation rules can be obtained that pertains to the identified lexeme. The entry can include at least one usage sense. A usage sense can be determined that is applicable for the identified lexeme based upon an evaluation of the disambiguation rules associated with said at least one usage sense. A text-to-speech result associated with the identified lexeme can depend upon the determined usage set.

Still another aspect of the present invention can include a text-to-speech system for converting text input to speech output. The system can include a text disambiguation engine that evaluates lexemes in accordance with a set of disambiguation rules that define usage senses for the lexemes. Each usage sense can have a conditional statement and a significance indicator. The conditional statement can define a set of conditions applicable for selecting the usage sense. The significance indicator can define an effect of the associated conditional statement evaluating as TRUE. Different text-to-speech results are produced by the text-to-speech system for an evaluated lexeme depending upon which of the associated usage senses are determined to be applicable by the text disambiguation engine for a particular usage instance.

It should be noted that various aspects of the invention can be implemented as a program for controlling computing equipment to implement the functions described herein, or a program for enabling computing equipment to perform processes corresponding to the steps disclosed herein. This program may be provided by storing the program in the magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

FIG. 2 is a collection of tables detailing the elements for defining the usage sense of a lexeme in accordance with an embodiment of the inventive arrangements disclosed herein.

DETAILED DESCRIPTION OF THE INVENTION

Figure 1:
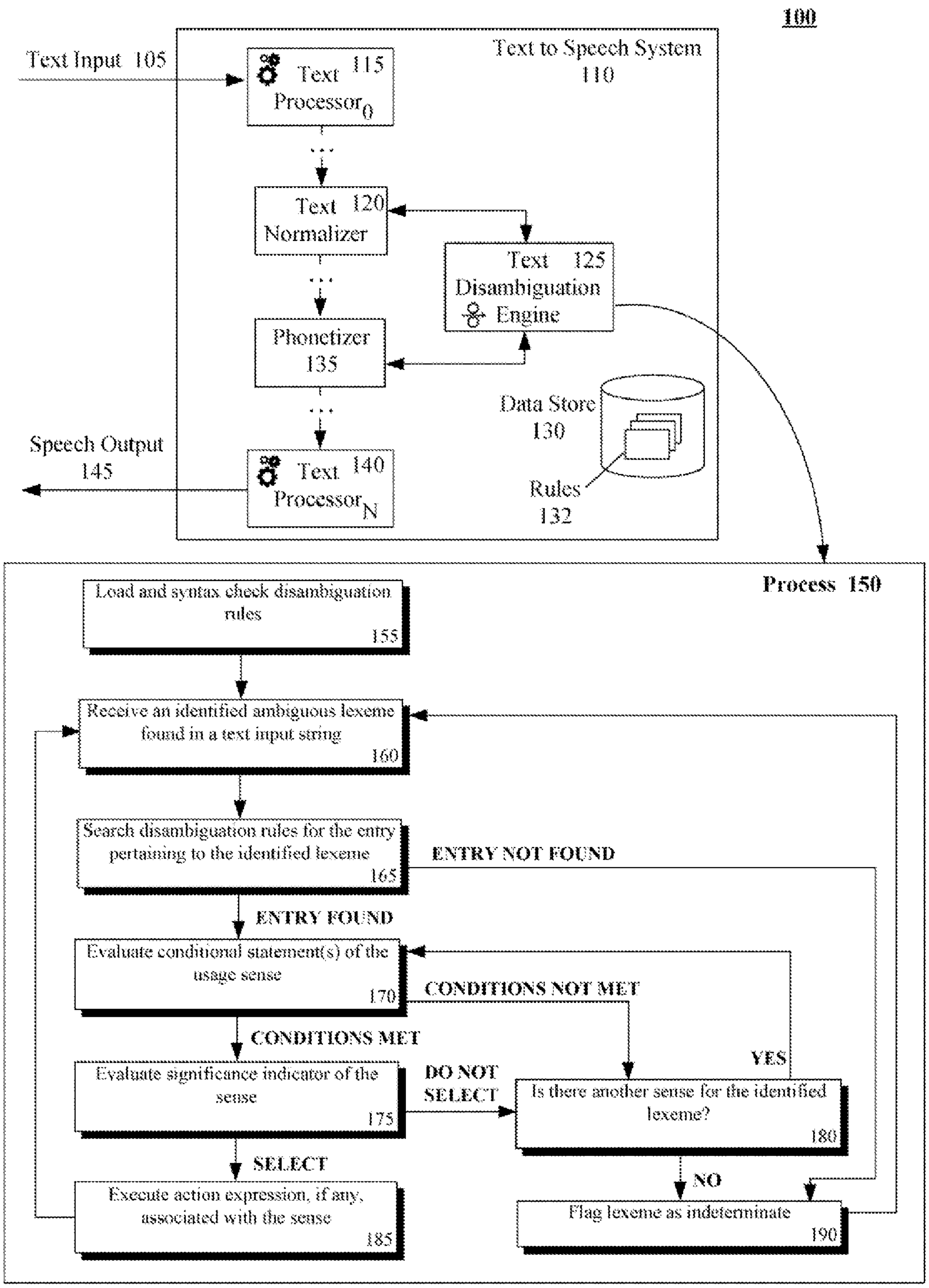
FIG. 1 is a compound diagram illustrating a system utilizing a process to disambiguate text using configurable lexeme based rules in accordance with embodiments of the inventive arrangements disclosed herein.

FIG. 1 is a compound diagram illustrating a system 100 utilizing a process 150 to disambiguate text using configurable lexeme based rules in accordance with embodiments of the inventive arrangements disclosed herein. System 100 can accept and process text input 105 to produce speech output 145. The text input 105 can be a string of alphanumeric characters, which can be provided by a computing system or person.

Ambiguous text constructs, such as acronyms, abbreviations, homograph, and the like, can be contained within the text input 105. As used herein, acronym can refer to a word formed from emphasized letters or syllables of other words, such as FAQ or DNA. An abbreviation can be a shortened form of a word or phase, just as NYC is short for New York City. A homograph can be one of two or more words alike in spelling, but different in meaning, derivation, or pronunciation. For example, the word "lives" can have different meanings and pronunciation depending upon use (e.g., he lives alone vs. a cat has nine lives).

Processing of the text input 105 can be performed by a text-to-speech system 110. It should be noted that the text-to-speech system 110 can be a component of a larger computing system. For example, the text-to-speech system 110 can be the component of a navigation system that provides audio directions to a driver. The text-to-speech system 110 can be a locally executing subsystem of a stand-alone computing device and/or can be a network element that is capable of concurrently supporting multiple remote systems, such as a turn based speech processing system.

The text-to-speech system 110 can include text processors 115, 120, 125, 135, and 140 that perform a variety of functions necessary to convert the text input 105 into speech output 145. Zero or more of the individual processors 115-140 can be utilized in system 110 along with additional optional processors (not shown). In other words, conversion of text 106 to speech 145 can involve a set of parallel and/or serial processing by $processor_0 \ldots processor_N$, where $processor_0$ is illustrated by text processor 115 and $processor_N$ is illustrated by text processor 140.

The text-to-speech system 110 can include a set of specialized processing components, such as a text normalizer 120, a text disambiguation engine 125, and a phonetizer 135. The text normalizer 120 can be a component that normalizes the text input 105. Normalization can transform the text input 105 into a predetermined format for consistent comparison and processing.

As part of the normalization process, the text normalizer 120 can attempt to clarify ambiguous lexemes contained within the text input 105 by utilizing the text disambiguation engine 125. As used herein, a lexeme can be defined as a lexical unit, such as a word or phrase, whose context relates to a specific concept. For example, the context of the lexeme "MS" can conjure thoughts of the state of Mississippi, a magazine title, a form of address for a woman, a neurological disorder, and so on. When multiple lexemes are detected that each includes a common set of words, the longest lexeme can be used. For example, "New York City" will be defined as a single lexeme to be evaluated even though it contains the lexeme "mew," the lexeme "New York," and the lexeme "city."

The text disambiguation engine 125 can be a component of the text-to-speech system 110 configured to disambiguate an identified lexeme in a text string. In order to disambiguate a lexeme, the text disambiguation engine 125 can utilize a set of disambiguation rules 132 contained within an accessible data store 130.

A disambiguation rule 132 entry can contain multiple defined usage senses of a lexeme that can include associated programmatic actions to perform when a sense is determined applicable. For example, the lexeme "COD" can have a usage sense as the acronym meaning "cash on delivery" as well as a default sense meaning the fish. When the sense for "cash on delivery" is selected the rule 132 can denote that the disambiguation of the lexeme "COD" can result in the acronym being written as is full text equivalent.

Additionally, the disambiguation rules 132 can include information that defines keywords and/or software procedures used to describe the usage sense of a lexeme. For example, software code can be stored in the data store 130 that defines the programmatic actions performed by the text disambiguation engine 125 for spelling out an acronym.

Upon completion of the disambiguation task, the text disambiguation engine 125 can convey the results back to the text normalizer 120. The text normalizer 120 can then pass the normalized and/or disambiguated text to another processing component and eventually to a phonetizer 135.

The phonetizer 135 can provide a phonemic translation of the processed text. Should the phonetizer 135 encounter ambiguous lexemes, such as homographs, in the processed text, the lexeme can be passed to the text disambiguation engine 125 for clarification. Once the phonetizer 135 clarifies ambiguities, the phonemic translation can be passed to the next text processor 140 to generate the speech output 145.

In order to disambiguate lexemes, the text disambiguation engine 125 can execute process 150. Process 150 can begin with step 155 where the disambiguation rules 132 can be loaded and their syntax checked. In step 160, the text disambiguation engine 125 can receive a lexeme that is identified as ambiguous. Identification of the lexeme as ambiguous can be determined by the text normalizer 120 and/or phonetizer 135.

Upon receipt of the lexeme, the text disambiguation engine 125 can search the rules 132 for the entry that pertains to the lexeme in step 165. When an entry for the lexeme is not found in the rules 132, the process can execute step 190 where disambiguation of the lexeme can be noted as indeterminate. A list of indeterminate lexemes can be stored within the data store 130 with the corresponding text string as a source of future additions to the disambiguation rules 132.

When an entry for the lexeme is found, flow proceeds to step 170 where conditional statement(s) that define the selection criteria of a usage sense can be evaluated. Satisfaction of the conditional statement(s) can lead to the evaluation of the significance indicator for that sense in step 175.

When the evaluation of the significance indicator does not garner the selection of the usage sense, step 180 can execute where the entry is examined for a subsequent sense. Step 180 can also execute when the conditional statement(s) are unfulfilled. When a subsequent sense is defined, flow returns to step 170 for evaluation of the conditional statement(s).

This iterative process can continue until the evaluation of a significance indicator results in the selection of a sense or all senses have been evaluated for applicability. When a subsequent sense does not exist for evaluation, the lexeme can be noted as indeterminate in step 190, just as when an entry does not exist for the lexeme. After being flagged as indeterminate, flow can return to step 160 to process the next ambiguous lexeme.

When the evaluation of the significance indicator results in the selection of the sense, step 185 can be performed where any associated action expression can be executed. Upon execution of the action expression, flow can return to step 160 to process the next ambiguous lexeme.

In another contemplated embodiment, the text disambiguation engine 125 can be implemented as processing component that is external to the text-to-speech system 110. As such, communications between the necessary text-to-speech system 110 components, such as the text normalizer 120, can be made over a network (not shown) utilizing the proper protocols. When real-time TTS processing is needed, however, performance considerations can make it preferential for the components 115-140 to be local to each other.

In yet another embodiment, the text disambiguation engine 125 can be integrated into the interpreter for a Speech Synthesis Markup Language (SSML) and/or Pronunciation Lexicon Specification (PLS).

As used herein, presented data stores, including store 130 can be a physical or virtual storage space configured to store digital information. Data store 130 can be physically implemented within any type of hardware including, but not limited to, a magnetic disk, an optical disk, a semiconductor memory, a digitally encoded plastic memory, a holographic memory, or any other recording medium. Data store 130 can be a stand-alone storage unit as well as a storage unit formed from a plurality of physical devices. Additionally, information can be stored within data store 130 in a variety of manners. For example, information can be stored within a database structure or can be stored within on or more files of a file storage system, where each file may or may not be indexed for information searching purposes. Further, data store 130 can utilize one or more encryption mechanisms to protect stored information from unauthorized access.

FIG. 2 is a collection of tables 200 detailing the elements for defining the usage sense of a lexeme in accordance with an embodiment of the inventive arrangements disclosed herein. The elements described in the collection 200 can be saved in a data store 130 and can be used to create the disambiguation rules 132 for use by the text disambiguation engine 125 of system 100. It should be noted that the entries listed in the collection of tables 200 are for illustrative purposes only and are not meant as an exhaustive listing.

Table 205 can contain conditional evaluation elements, directives 210 and their corresponding satisfaction requirements 215, that can be used to define the selection criteria for a usage sense. The directive 210 can be a keyword or designation that represents a defined condition of the lexeme or text surrounding the lexeme that must be met in order for the sense to be selected.

In order for the directive 210 to be evaluated as TRUE, the lexeme and/or surrounding text can meet the satisfaction requirements 215 associated with the directive. As shown in this example, the directives 210 and satisfaction requirements 215 can examine the word composition and/or grammar composition of a text string for specified elements. For example, the upper_case directive can determine if a lexeme appears entirely in upper case letters, as abbreviations and acronyms often appear. Directives 210 shown and defined in table 205 include part_of_speech (POS), word, word_set, upper_case, lower_case, mixed_case, capitalization, digit_string, and punctuation (punct).

A context range specification 220 can be used to numerically express the range of text to examine when evaluating a conditional statement. As shown in this example, a number line of range values 230 can be constructed to correspond to every word in the input string 225 with the identified lexeme 227 as the zero element. The range values 230 can indicate directionality with respect to the lexeme 227 by using a negative sign to indicate elements to the left of the lexeme 227, similar to how numbers are assigned on a mathematical number line of integer values.

Table 235 can contain examples of indicators 240 and their corresponding definitions. An indicator 240 can represent the level of satisfaction required to select the associated usage sense. The indicator 240 can be expressed as a keyword term that can denote an absolute condition or as an integer value that can be added to an overall selection score for the sense. Absolute indicators 240 can include a necessary indicator and a sufficient indicator. In the absence of a satisfied absolute indicator 240, the sense with the highest selection score can be selected for the lexeme. For example, in one usage instance the fish related sense for the lexeme "cod" can have a value of seventy five and the Cash on Delivery sense can have a value of fifty, which causes the fish related sense to be selected.

Table 250 can contain examples of expressions 255, their corresponding action 260, and any required parameters 265. An action expression 255 can be executed when its associated sense is selected. For example, the homographic lexeme "contract" used in the context of "sign a contract" can result in the selection of a sense with the action expressions 255 insert_phones. Execution of this expression 255 can result in the specified phonemic representation of the lexeme to be used by the phonetizer when translating the lexeme. Expressions 255 as shown in table 250 can include substitute, spell_out, insert_phones, and delete_trailing_period. These expressions are illustrative in nature and are not intended to be exhaustive.

Figure 3:
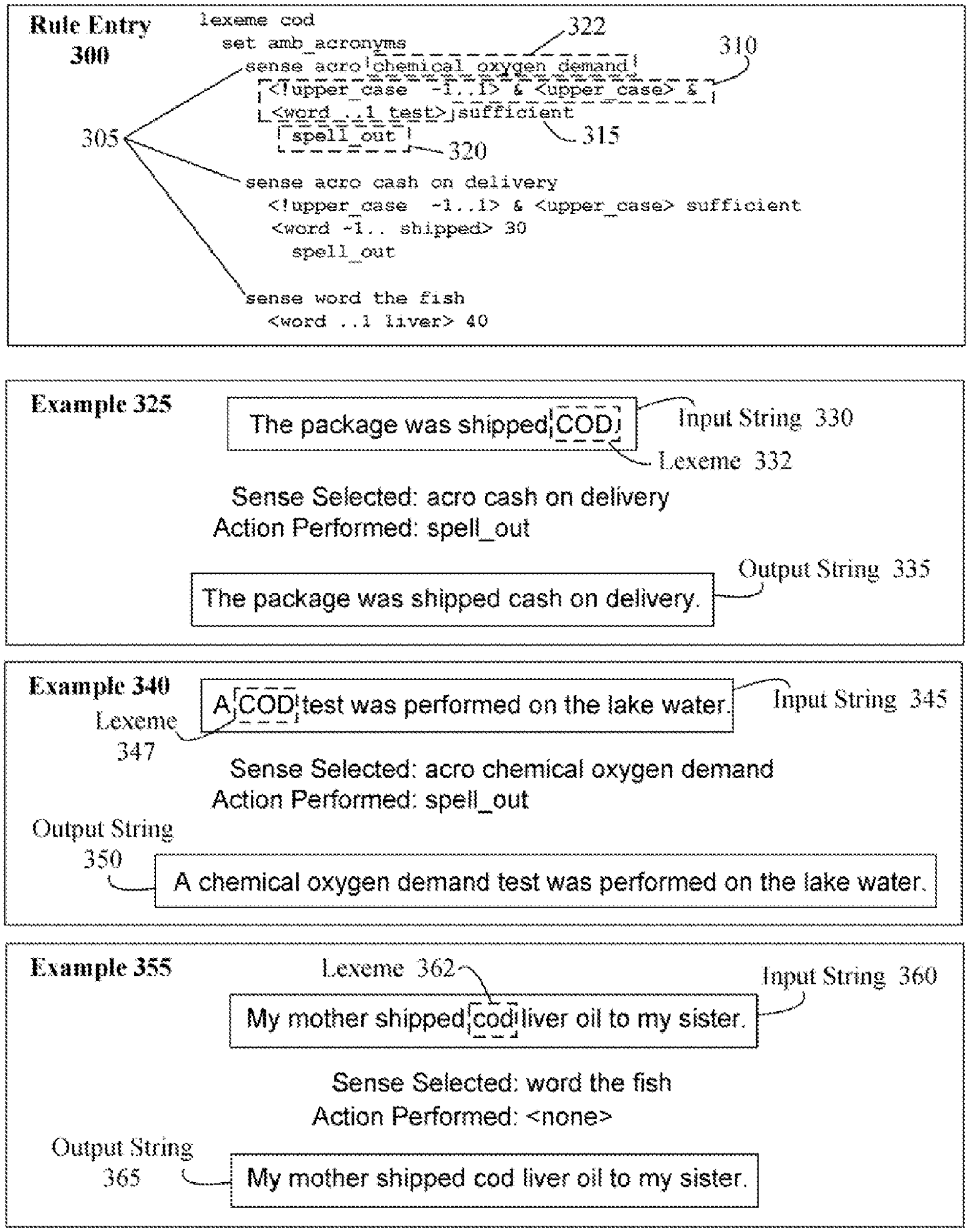
FIG. 3 presents a sample disambiguation rule entry and examples that illustrate the interaction of rule elements to disambiguate a lexeme in accordance with an embodiment of the inventive arrangements disclosed herein.

FIG. 3 presents a sample of disambiguation rule entry 300 and examples 325, 350, 355 that illustrate the interaction of rule elements to disambiguate a lexeme in accordance with an embodiment of the inventive arrangements disclosed herein. Entry 300 can be used in the context of system 100 using the elements described in FIG. 2 or in the context of any other system supporting the use of configurable lexeme based rules for disambiguation.

It should be noted that the structure shown in the sample rule entry 300 is for illustrative purposes and is not intended to represent an absolute implementation or limitation to the present invention.

The rule entry 300 can contain one or more usage senses 305. A usage sense 305 can consist of one or more conditional statements 310, a significance indicator 315, and an action expression 320. In this example for the lexeme "cod", senses are defined for use of "cod" as an acronym for the phrase "chemical oxygen demand", as an acronym for the phrase "cash on delivery", and as the word pertaining to the fish. For the purpose of illustrating the structural components, the sense pertaining to chemical oxygen demand will be used.

In this example, the conditional statement 310 contains three conditions joined together by BOOLEAN logic (&) meaning that all three conditions must evaluate as TRUE in order for the statement 310, as a whole, to evaluate as TRUE. The first condition, "<!upper_case ~. . . 1>", states that one word to the left and one word to the right of the lexeme must not, indicated by the exclamation point, be in all upper case letters.

The second condition, <upper_case>, means that the lexeme itself must be in upper case lettering. As shown in the context range specification 220 of FIG. 2, the lexeme 227 has a range value 230 of zero. Thus, the omission of a context range specification from the condition can indicate that only the lexeme is to be examined. The third condition, <word . . . 1 test>, requires that the word "test" be located immediately to the right of the lexeme.

The conditional statement 310 has a significance indicator 315 of "sufficient". This significance indicator 315 can mean that the evaluation of the conditional statement 310 as TRUE is sufficient to select this sense 305. When both the conditional statement 310 and significance indicator 310 are satisfied, the associated action expression 320, "spell_out", can be executed, which can replace the lexeme with its expanded phrase 322.

Example 325 can include an input string 330 containing a possible form of the lexeme 332 "cod". Acting as a text disambiguation engine using the sample rule entry 300, the first sense of the entry 300 can be evaluated for applicability. Although the lexeme 332 satisfies the first two conditions, the word to the left of the lexeme is not in upper case lettering and the lexeme 332 is in upper case lettering, it does not fulfill the third condition, having the word "test" to the right of the lexeme. Since all three conditions must be TRUE, the conditional statement must be evaluated as FALSE.

The next defined sense can then be examined for applicability. In this example, the second sense contains two conditional statements each with different significance indicators. The first conditional statement evaluates as TRUE because the proceeding and subsequent words are not upper case and the lexeme 332 is in upper case. Since the significance indicator for this conditional statement is "sufficient", this sense can be selected without further evaluation of other conditional statements and/or senses.

Execution of the action expression can result in a modified output string 335, where the lexeme 332 can be replaced with a defined full text equivalent. The output string 335 can be passed to another component for additional processing.

Example 340 can include an input string 345 containing a possible form of the lexeme 347 "cod". Acting as a text disambiguation engine using the sample rule entry 300, the first sense of the entry 300 can be evaluated for applicability. Unlike example 325, the word "test" does follow the identified lexeme 347, which can result in the conditional statement evaluating as TRUE.

Since the significance indicator for this conditional statement is "sufficient", this sense can be selected without further evaluation of other conditional statements and/or senses. Execution of the action expression can result in a modified output string 350, where the lexeme 347 can be replaced with a defined full text equivalent. The output string 350 can be passed to another component for additional processing.

Example 355 can include an input string 360 containing a possible form of the lexeme 362 "cod". Acting as a text disambiguation engine using the sample rule entry 300, the first sense of the entry 300 can be evaluated for applicability. The lexeme 362 and the contents of the input string 360 does not satisfy any of the conditions of the first sense. Since all three conditions must be TRUE, the conditional statement must be evaluated as FALSE.

The next defined sense can then be examined for applicability. In this example, the second sense contains two conditional statements each with different significance indicators. The first conditional statement evaluates as FALSE because neither the proceeding and subsequent words are upper case nor is the lexeme in 362 in upper case.

The second conditional statement, however, evaluates as TRUE, since the word to the left of the lexeme in 362 is the word "shipped". The significance indicator for this conditional statement is the integer value "30". This means that this sense can be selected if no other sense with a significance indicator of "necessary" or "sufficient" or a higher integer value is satisfied.

Since a sense with a significance indicator of "sufficient" has not been satisfied as of yet, the next sense can be evaluated for applicability. The next conditional statement can be evaluated as TRUE since the word "liver" appears to the right of the lexeme 362 in the input string 360. This significance of this sense can then be set to the integer value "40".

With no other senses defined, the senses that were evaluated with integer values can be compared to determine which is more applicable. The last defined sense can be chosen since it has a higher significance indicator integer value. This sense does not have an associated action expression. Therefore, the output string 365 is equivalent to the input string 360.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A computer program product comprising a computer-readable storage device encoded with computer-executable instructions that, when executed by a computing device, perform a method for disambiguating text that is to be converted to speech using lexeme based rules, said instructions comprising:

at least one conditional statement for use in a text disambiguation engine of a text-to-speech system, wherein the conditional statement defines a sense of usage for a lexeme and wherein the conditional statement includes a context range specification, the at least one conditional statement including a first conditional statement for determining a sense of usage of a lexeme as an acronym and a second conditional statement for determining a sense of usage of the lexeme as a word, wherein the first conditional statement and/or the second conditional statement distinguishes between the sense of usage of the lexeme as an acronym and the sense of usage of the lexeme as a word at least in part by requiring a specified word within a specified context range of words of the lexeme;

a significance indicator associated with each conditional statement, wherein the significance indicator defines a criteria for selecting an associated sense of usage; and in response to selecting a sense of usage corresponding to the lexeme used as an acronym, replacing the lexeme with a defined full text equivalent.

2. The language of claim 1, wherein the values permitted for the significance indicator include a value selected from a group of values consisting of necessary, sufficient, and a numeric value, wherein necessary indicates that an associated conditional statement must be satisfied for the corresponding sense of usage to be chosen, wherein sufficient indicates that when the associated conditional statement is satisfied that the corresponding sense of usage is to be chosen without evaluating subsequent senses of usage, and wherein the numeric value represents a score for the corresponding sense when the corresponding conditional statement is satisfied, and wherein the sense of usage having the highest associated score is chosen.

3. The computer program product of claim 1, further comprising:

an action expression associated with the conditional statement, wherein the action expression defines a set of programmatic actions to be executed upon a selection of the associated usage sense.

4. The computer program product of claim 3, wherein values permitted for the action expression include a substitute action, a spell_out action, and an insert__ phones action.

5. The language of claim 1, wherein the conditional statement comprises at least one directive that represents a defined condition of at least one of the lexeme and text surrounding the lexeme.

6. The language of claim 5, wherein a value for the directive comprises at least three values selected from a group consisting of POS, word, word_set, upper_case, lower_case, mixed_case, capitalized, digit_string, and punctuation.

7. The computer program product of claim 1, wherein the language conforms to a Pronunciation Lexicon Specification (PLS).

8. A method for disambiguating lexemes in text-to-speech processing comprising:

loading a set of disambiguation rules for use in a text disambiguation engine of a text-to-speech system, wherein the disambiguation rules include a plurality of entries that define usage senses for lexemes, wherein each usage sense for each of the entries comprises: at least one conditional statement that defines a sense of usage for a lexeme; and a significance indicator associated with the conditional statement, wherein the significance indicator defines a criteria for selecting an associated sense of usage and wherein the at least one conditional statement includes a context range specification, wherein the set of disambiguation rules includes a first conditional statement for determining a sense of usage of a lexeme as an acronym and a second conditional statement for determining a sense of usage of the lexeme as a word, wherein the first conditional statement and/or the second conditional statement distinguishes between the sense of usage of the lexeme as an acronym and the sense of usage of the lexeme as a word at least in part by requiring a specified word within a specified context range of words of the lexeme;

identifying, by the text disambiguation engine of the text-to-speech system, an ambiguous lexeme in a text input string;

obtaining, by the text disambiguation engine of the text-to-speech system, the entry in the disambiguation rules that pertains to the identified lexeme, wherein the entry comprises at least one usage sense;

determining, by the text disambiguation engine of the text-to-speech system, an applicable one of said at least one usage sense for the identified lexeme based upon an evaluation of the disambiguation rules associated with said at least one usage sense; and in response to determining a usage sense corresponding to the lexeme used as an acronym, replacing the lexeme with a defined full text equivalent.

9. The method of claim 8, wherein the obtained entry comprises a plurality of different usage senses, and wherein a text-to-speech result of the speech processing engine for the identified lexeme varies depending upon the determined usage sense.

10. The method of claim 8, wherein said set of disambiguation rules are rules used by the text disambiguation engine for disambiguating acronyms, abbreviations, and homographs.

11. The method of claim 8, wherein particular ones of the usage senses comprise an optional action expression, where each action expression is associated with the conditional statement, and wherein the action expression defines a set of programmatic actions to be executed upon a selection of the associated usage sense.

12. The method of claim 8, further comprising:

performing an action defined by the determined usage sense.

13. The method of claim 8, wherein the determining step further comprises:

evaluating at least one conditional statement associated with the usage sense;

when the conditional statement is satisfied, evaluating a significance indicator associated with the sense; and when the significance indicator is a value of sufficient, selecting the associated sense.

14. A computer-readable storage device encoded with computer-executable instructions that, when executed by a computing device, perform the method of claim 8.

15. A text-to-speech system for converting text input to speech output comprising:

a text disambiguation engine configured to evaluate lexemes in accordance with a set of disambiguation rules that define usage senses for the lexemes, each usage sense having a conditional statement and a significance indicator, wherein the conditional statement defines a set of conditions applicable for selecting the usage sense, wherein the significance indicator defines an effect of the associated conditional statement evaluating as TRUE, wherein the different text-to-speech results are produced by the text-to-speech system for an evaluated lexeme depending upon which of the associated usage senses are determined to be applicable by the text disambiguation engine for a particular usage instance, wherein the conditional statement includes a context range specification, wherein the set of disambiguation rules includes a first conditional statement for determining a sense of usage of a lexeme as an acronym and a second conditional statement for determining a sense of usage of the lexeme as a word, wherein the first conditional statement and/or the second conditional statement distinguishes between the sense of usage of the lexeme as an acronym and the sense of usage of the lexeme as a word at least in part by requiring a specified word within a specified context range of words of the lexeme, and to replace the lexeme with a defined full text equivalent in response to selecting a usage sense corresponding to the lexeme used as an acronym.

16. The text-to-speech system of claim 15, wherein an action expression is able to be associated with each usage sense, wherein the action expression defines a set of programmatic actions to be executed upon a selection of the associated usage sense.

17. The text-to-speech system of claim 15, further comprising:

a text normalizer; and a phonetizer, wherein both the text normalizer and the phonetizer use the text disambiguation engine to resolve ambiguities.

* * * * *

UNITED STATES PATENT AND TRADEMARK OFFICE

CERTIFICATE OF CORRECTION

PATENT NO. : 8,538,743 B2
APPLICATION NO. : 11/689271
DATED : September 17, 2013
INVENTOR(S) : Oswaldo Gago et al.

It is certified that error appears in the above-identified patent and that said Letters Patent is hereby corrected as shown below:

In the Claims

At column 9, claim 2, line 18 should read as follows:
2. The computer program product of claim 1, wherein the values permitted At column 9, claim 5, line 40 should read as follows:
5. The computer program product of claim 1, wherein the conditional state- At column 9, claim 6, line 44 should read as follows:
6. The computer program product of claim 5, wherein a value for the directive Signed and Sealed this
Fourth Day of November, 2014

Michelle K. Lee
*Deputy Director of the United States Patent and Trademark Office*